Oct. 20, 1964  J. A. DORR  3,153,772
FORCE TRANSDUCER
Filed March 31, 1961
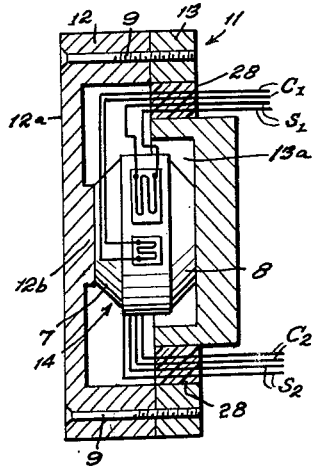
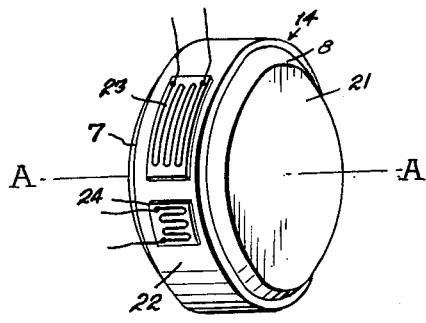  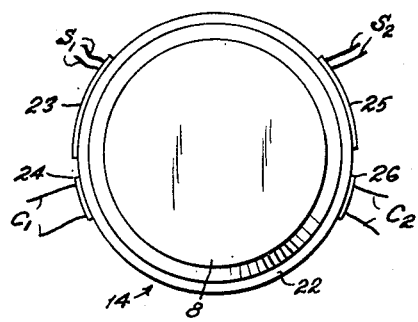
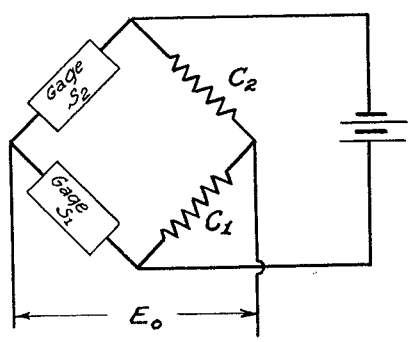
INVENTOR.
John A. Dorr

United States Patent Office 3,153,772
Patented Oct. 20, 1964

3,153,772
FORCE TRANSDUCER
John A. Dorr, Frederick, Md., assignor to the United States of America as represented by the Secretary of the Army
Filed Mar. 31, 1961, Ser. No. 99,971
5 Claims. (Cl. 340—17)
(Granted under Title 35, U.S. Code (1952), sec. 266)

The invention described herein may be manufactured by or for the Government of the United States of America for governmental purposes without the payment of any royalties thereon.

This invention relates to a novel force transducer and has for one of its objects a device by means of which energy received by one transmission system can flow to another transmission system.

Another object of this invention is a device of an expendable nature which can be utilized to detect and measure the intensity of seismic disturbances.

A further object is to provide a miniaturized soil-stress gage which will be so small that transient stresses in the soil medium will not be appreciably affected by the presence of the gage in the medium.

Still another object is to provide a soil-stress gage whose sensitivity and operating range may be easily varied.

Other objects and advantages of the invention will hereinafter become more fully apparent from the following description of the annexed drawings which illustrate a preferred embodiment and wherein:

FIGURE 1 illustrates a cross-sectional view of the instant soil-stress gage;

FIGURE 2 illustrates an enlarged view of the resilient sensing mechanism including strain gages;

FIGURE 3 illustrates a plan view of the sensing mechanism of FIGURE 2; and

FIGURE 4 illustrates a typical wiring diagram of the Wheatstone bridge circuit employed in this invention.

This invention envisions using a resilient measuring device which, when impinged upon by a seismic stress disturbance, creates a measurable strain the extent of which is proportional to the force producing it.

Referring now in greater detail to the drawings, wherein like reference characters designate like or corresponding parts throughout the several views, there is shown in FIGURE 1 a disc-shaped metallic housing 11 comprised of mating discs 12 and 13 secured together face to face by a plurality of evenly spaced screws 9, and forming a waterproof seal. Wall 12a of disc 12 has a circular boss portion 12b at its center, is relatively thin and resilient in an axial direction and subject to flexing by shock waves impinging on the surface thereof. Disc 13 has a recess 13a at its center so as to be able to receive a portion of transducer 14 when the device is assembled.

Transducer 14, shown in enlarged view in FIGURE 2, is comprised of a dense rubber disc 21, a Duralumin ring 22 carrying four strain gages 23, 24, 25, and 26 having respectively, leads $S_1$, $C_1$, $S_2$, and $C_2$. Gages 23 and 25 along with their corresponding leads $S_1$ and $S_2$ are the strain gages constituting the active arms of the Wheatstone bridge circuit shown in FIGURE 3, and gages 24 and 26 with corresponding lead wires $C_1$ and $C_2$ are the temperature sensing gages and constitute the inactive arms of the Wheatstone bridge.

Rubber disc 21, surrounded at its midsection in an interference fit by ring 22, has its exposed end portions beveled so as to form conical frustums 7 and 8. Two pairs of strain gages 23, 24 and 25, 26, respectively, are bonded to the outer peripheral surface of ring 22, each pair being positioned so as to be substantially diametrically opposed. It is to be understood that the sensing strain gages 23 and 25, forming the active arms of the Wheatstone bridge, are so oriented that their parallel, strain sensitive conductors are transverse to axis A—A, while the temperature compensating gages 24 and 26, comprising the inactive arms of the Wheatstone bridge, are oriented so that their strain sensitive conductors are parallel to axis A—A. An arrangement such as this provides adequate temperature compensation inasmuch as all four strain gages are equally affected by thermal expansion or contraction of Duralumin ring 22.

It is to be further understood that in lieu of dense rubber material for disc 21, any suitable resilient material having a high Poisson's ratio may be used, and similarly, in lieu of Duralumin for ring 22, any material having a suitable Young's modulus may be employed.

With regard to disc-shaped housing 11, portion 12a is a thin, resilient wall subject to flexing when impinged by seismic disturbance waves.

In the assembled condition, transducer 14 is supported interiorly of housing 11 between boss 12b and recess 13a in a slightly pre-stressed or compressed condition because of its resilient characteristics, i.e., the length of transducer 14 along axis A—A is slightly longer than the corresponding length of the space it occupies within housing 11.

Prior to assembly, however, strain gages 23, 24, 25, and 26 are suitably mounted on ring 22 and their respective lead wires $S_1$, $C_1$, $S_2$, and $C_2$, are passed through openings provided in suitably insulated and waterproofed plugs 28 to the exterior of housing 11, are in turn connected in the usual manner to the electrically balanced Wheatstone bridge shown in FIGURE 3, whose output $E_o$ is fed into any form of conventional recording apparatus such as a recording oscilloscope or brush recorder.

In operation, the assembled device is buried in the ground with wall 12a facing the source of the seismic disturbance to be measured. Lead wires $S_1$, $C_1$, $S_2$, and $C_2$ are lead to the ground surface and connected to the bridge circuit. As the propagated shock waves impinge upon the flexible wall 12a, the force thereof compresses rubber disc 21 which in turn exerts a radial stress resulting in a tensile strain in ring 22, such strain being detected by sensing strain gages 23 and 25, the result varying the bridge circuit output at $E_o$.

Various modifications are contemplated and may obviously be resorted to by those skilled in the art without departing from the spirit of the invention and the scope of the claims.

Having thus described the invention, what is claimed and desired to be secured by Letters Patent of the United States is:

1. A sensing element for use with a seismographic device comprising a dense, resilient rubber member having a cylindrical mid-portion and two beveled end portions each forming a conical frustum, a stress-sensitive metallic band in an interference fit with said cylindrical mid-portion whereby axially induced stresses on said rubber member will result in tensile strain of said metallic band, and a plurality of strain sensitive gages mounted on the periphery of said metallic band.

2. A seismic disturbance sensing and recording apparatus comprising a metallic housing having parallel opposed wall portions, one of said wall members being responsive to shock waves, a sensing element firmly held by and between said wall portions, said sensing element being comprised of dense, resilient rubber having a cylindrically shaped mid-portion and beveled at each end thereby forming a pair of conical frustums, a stress-sensitive metallic band in an interference fit with said cylindrically shaped mid-portion, a first and second pair of strain gages mounted to the outer periphery of said metallic band, said first pair of strain gages being substantially diametrically opposed from one another and having their strain-sensitive conductors oriented in a direction which is transverse to the longitudinal axis of said sensing element, said second pair of strain gages being substantially diametrically opposed from one another and juxtaposed with said first pair of strain gages, the strain-sensitive conductors of said second pair of gages being oriented in a position which is parallel to the longitudinal axis of said sensing element, and electrical conductors leading from each strain gage through said housing to a Wheatstone bridge having output terminals which may be connected to a calibrated recording mechanism.

3. A force transducer comprising a substantially cylindrical sensing member of a resilient material having a cylindrical outer surface, a cylindrical ring snugly fitting around the cylindrical outer surface of the resilient material, a plurality of gages mounted on the outer periphery of the cylindrical ring, said gages being firmly attached to the ring whereby variations of pressure applied to an end of said cylindrical sensing member will result in expansion and contraction of said cylindrical ring and whereby said gages will be distorted in proportion to the magnitude of the variations of pressure applied to said end of said cylindrical sensing member.

4. A force transducer as set forth in claim 3, and a casing having a portion contacting said end of said cylindrical sensing member whereby variations of pressure applied to said casing will be transmitted to said cylindrical sensing member.

5. A force transducer as set forth in claim 3, said gages comprising strain gages and temperature compensating gages connected to form the legs of a Wheatstone bridge circuit with the output varying in proportion to the variations of pressure applied to said end of said sensing member.

References Cited in the file of this patent
UNITED STATES PATENTS

| | | |
|---|---|---|
| 2,771,579 | Ruge | Nov. 20, 1956 |
| 2,879,450 | Baker | Mar. 24, 1959 |
| 2,947,823 | Harris | Aug. 2, 1960 |